No. 798,164. PATENTED AUG. 29, 1905.
H. J. CASE.
GRAIN DRILL.
APPLICATION FILED JUNE 22, 1905.
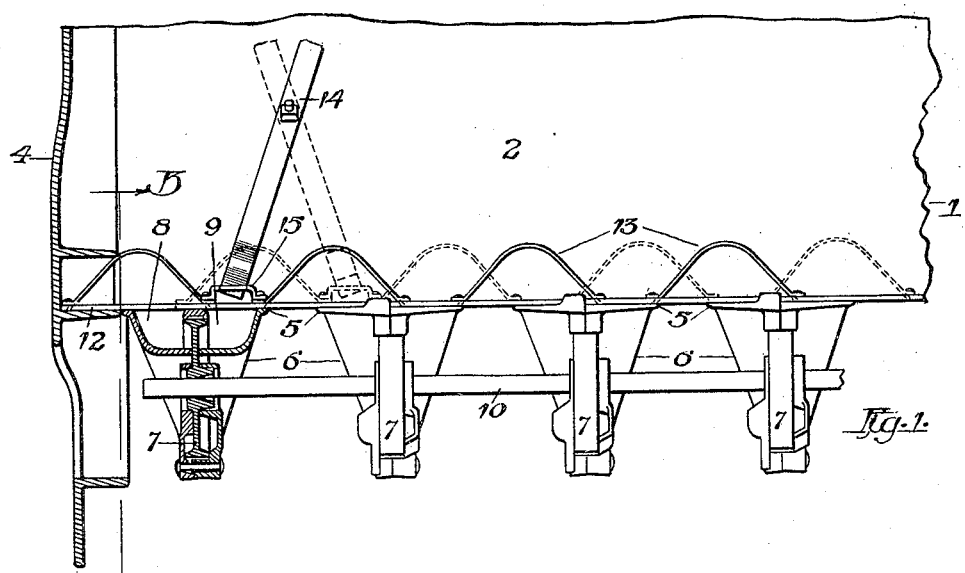
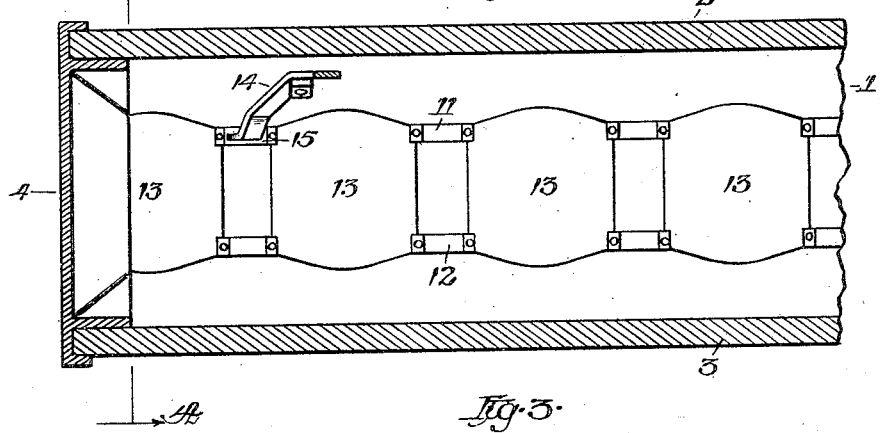
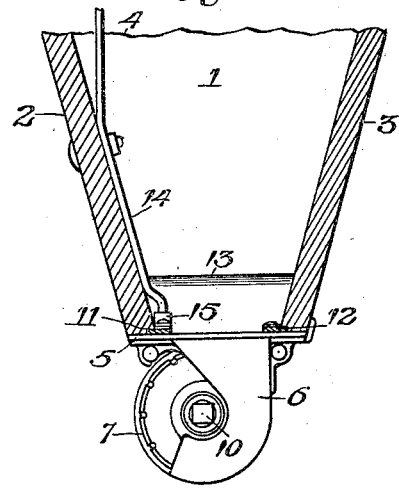
Witnesses:
Inventor
Henry J. Case.
By
Attorney.

UNITED STATES PATENT OFFICE.

HENRY J. CASE, OF OWASCO, NEW YORK, ASSIGNOR TO INTERNATIONAL HARVESTER COMPANY, A CORPORATION OF NEW JERSEY.

GRAIN-DRILL.

No. 798,164.  Specification of Letters Patent.  Patented Aug. 29, 1905.

Application filed June 22, 1905. Serial No. 266,393.

*To all whom it may concern:*

Be it known that I, HENRY J. CASE, a citizen of the United States, residing at the town of Owasco, in the county of Cayuga and State of New York, have invented certain new and useful Improvements in Grain-Drills, of which the following is a specification, reference being had to the accompanying drawings, forming a part thereof.

My invention relates to grain-drills, and in particular to devices for directing the flow of grain to either side of the grain-distributers, said distributers being those having a well-known form.

It consists in longitudinally-sliding bars located at the bottom of the hopper and having grain-deflectors secured thereto and means for moving the bars longitudinally for the purpose of adjusting the deflectors in a manner to permit a flow of grain to either of the two sides of the distributers, the object of the invention being to provide a mechanism that may be adjusted quickly and accurately, as occasion may require. I attain this object by the mechanism illustrated in the accompanying drawings, in which—

Figure 1 represents a side elevation, partly in section, of a part of a grain-hopper embodying my invention. Fig. 2 is a plan view, partly in section, of Fig. 1; and Fig. 3 is a cross-section on line A B of Figs. 1 and 2.

Similar numerals refer to similar parts throughout the several views.

1 represents the grain-hopper, 2 and 3 the sides thereof, and 4 one of the ends. A series of bottom plates 5 are secured to the sides, and integral with the plates are distributer-casings 6, that are adapted to receive the distributer-wheels 7 of a well-known disk form, having feeding-surfaces upon opposite sides thereof designed to distribute different kinds of grain as it is presented to either of the sides by the oppositely-disposed ducts 8 and 9 of said distributer-casings. The distributer-wheels are mounted upon a longitudinal shaft 10, arranged at the bottom of the hopper and deriving motion by any of many well-known ways. The sides of the hopper at their inner bottom edges are provided with rabbets adapted to receive loosely the outer edges of flat bars 11 and 12, that rest upon the bottom plates 5 and extend throughout the length of the hopper. Mounted upon the bars are a series of arched grain-deflectors 13, that are secured thereto at their outer corners and designed to bridge the spaces between corresponding ducts in the distributer-casings, and thereby expose or cover said corresponding ducts. Pivotally mounted on one of the sides of the hopper is a hand-lever 14, having its lower end engaging with a slotted loop-piece 15, secured to one of the sliding bars. The length of the bars is proportionate with the length of the hopper, and when they are adjusted in one direction in a manner to expose one series of ducts the end of the bars will contact with the end of the hopper, as shown in Fig. 1, and when adjusted in an opposite direction to expose the other series of ducts, as shown by dotted lines in Fig. 1, their movement will be limited in the same manner.

What I claim as being my invention, and desire to secure by Letters Patent, is—

1. In a grain-drill, the combination of a hopper, a series of grain-distributers mounted at the bottom thereof, a series of ducts arranged to deliver grain to opposite sides of said distributers, a series of deflectors adapted to individually deflect grain to corresponding ducts in said series, and means for adjusting the said series of deflectors simultaneously in a manner to expose or cover said corresponding ducts.

2. In a grain-drill, the combination of a hopper, a series of grain-distributers mounted at the bottom thereof, a series of ducts arranged to deliver grain to opposite sides of said distributers, a series of deflectors adapted to individually deflect grain to corresponding ducts in said series, said deflectors being secured to longitudinally-sliding bars, and means for adjusting said bars in a manner to cause said deflectors to expose or cover said corresponding ducts.

3. In a grain-drill, the combination of a hopper, a series of grain-distributers mounted at the bottom thereof, a series of ducts arranged to deliver grain to opposite sides of said distributers, a series of deflectors adapted to individually deflect grain to corresponding ducts in said series, said deflectors being secured to longitudinally-sliding bars, and a hand-lever pivotally mounted on said hopper and engaging with one of said bars in a manner to adjust said series of deflectors in position to expose or cover said corresponding ducts.

4. In a grain-drill, the combination of a hopper, a series of grain-distributers mounted at the bottom thereof, a series of ducts arranged to deliver grain to opposite sides of said distributers, a series of arched deflectors adapted to bridge the spaces between each pair of corresponding ducts and to individually deflect grain to said ducts, said deflectors being secured to longitudinally-sliding bars, and a hand-lever pivotally mounted on a side of said hopper intermediate its ends and engaging with one of said sliding bars in a manner to adjust said series of deflectors in position to expose or cover said corresponding ducts.

5. In a grain-drill, the combination of a hopper comprising oppositely-disposed sides and ends, said sides having longitudinally-extending rabbets at their inner lower corners, bottom plates secured to said sides and having distributer-disks mounted thereon, ducts integral with said plates and adapted to conduct grain to opposite sides of said distributer-disks, longitudinally-sliding bars loosely seated in said rabbets above said bottom plates, arched deflector-plates secured to said bars bridging the spaces between corresponding ducts and adapted to deflect grain thereto, and a hand-lever pivotally mounted on said hopper and engaging with one of said bars in a manner to adjust said deflector-plates in position to expose or cover said corresponding ducts.

In witness whereof I hereto affix my signature in presence of two witnesses.

HENRY J. CASE.

Witnesses:
 GEO. W. HENDERSON,
 R. F. HAJICEK.